Patented Jan. 13, 1931

1,788,632

UNITED STATES PATENT OFFICE

DONALD H. POWERS, OF PENNS GROVE, NEW JERSEY, ASSIGNOR TO E. I. DU PONT DE NEMOURS & COMPANY, OF WILMINGTON, DELAWARE, A CORPORATION OF DELAWARE

PROCESS OF MAKING ORGANIC SULPHUR COMPOUNDS

No Drawing.  Application filed July 13, 1928.  Serial No. 292,609.

This invention relates to a process for making certain organic sulphur compounds. More particularly it relates to a novel method for the production of organic sulphur compounds from the dithio and trithio acids and comprises the step of treating a salt of the thio acid with a cyanogen halide.

It has been found that cyanogen chloride reacts with the salts of the thio acids to give the corresponding organic sulphur compounds in substantially quantitative yields. Thus, cyanogen chloride reacts with the dimethyl ammonium salt of dimethyl dithio carbamate in aqueous solution to give tetra methyl thiuram mono sulphide in quantitative yields and of higher purity than the product obtained by the methods heretofore employed. It has also been found that, in particular, the alkali metal salts of the dithio and trithio acids react with the cyanogen halides to give approximately quantitative yields. These reactions are preferably carried out in aqueous solution since the alkali salts are only slightly soluble or are insoluble in alcohol.

The following examples are furnished as typical embodiments of the new process.

Example 1

Three hundred pounds of sodium dimethyl dithio carbamate is dissolved in seventy-five gallons of water. Sixty-two pounds of cyanogen chloride dissolved in one hundred and fifty gallons of water is carefully added. The temperature is allowed to rise during the addition of the CNCl. The tetramethyl thiuram mono sulphide separates as a light yellow, crystalline, water insoluble product.

Example 2

One hundred and sixty pounds of potassium ethyl xanthate is dissolved in forty gallons of water and thirty pounds of liquid cyanogen chloride is slowly added to the solution.

When the addition is complete the yellow crystalline product, which is believed to be di-o-ethyl thiocarbonic mono sulphide is separated and dried in the usual way.

Example 3

One hundred and seventy-five pounds of sodium dithio benzoate, made up to a saturated aqueous solution is treated with thirty pounds of cyanogen chloride passed beneath the surface of the solution in the vapor state. The reaction product separates as a water insoluble material and is collected and dried.

Example 4

One hundred and sixty pounds of sodium ethyl trithio carbonate is dissolved in water and treated with fifty pounds of molten cyanogen bromide. The reaction product is completely water insoluble and is drawn off and vacuum dried.

Example 5

Four hundred and twenty-five pounds of sodium phenyl methyl dithio carbamate is dissolved in seventy-five gallons of water. Sixty-two pounds of cyanogen chloride dissolved in one hundred and fifty gallons of water is carefully added. The temperature is allowed to rise during the addition of the CNCl. The diphenyl-di-methyl thiuram mono sulphide separates as a light yellow, crystalline, water insoluble product.

It is to be understood that the above examples are presented for purposes of illustration and that the invention is not limited specifically thereto. Variations may be made within the scope of the appended claims and equivalents may be employed.

The described reaction, as will appear from the examples, has been found to apply broadly to dithio and trithio acids, as illustrated by the equation

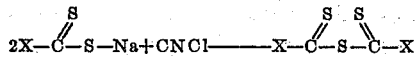

Where $X = R_2N-$ for dithio carbamic acids
$X = R-O-$ for xanthic acids
$X = R-$ for alkyl or aryl dithio acids
$X = R-S-$ for trithio acids and R represents an aliphatic or aromatic hydrocarbon group.

The use of cyanogen chloride and the use of the alkali metal salts, it has been found, both contribute to the higher yields and superior quality of the products obtained. In the preferred embodiment of the invention, the cyanogen chloride is reacted with an alkali metal salt of a dithio acid. Water is the preferred solvent.

By the terms "salt of a dithio or trithio acid" as employed in the appended claims, it is intended to cover not only the metal salts of these acids but, in addition the ammonium salts, whether the ammonium radical is unsubstituted or substituted by alkyl groups. It is also to be understood that the term "dithio acids" as employed in the appended claims denotes not only alkyl and aryl dithio acids but the xanthic and dithio-carbamic acids as well.

I claim:

1. The process of making organic sulphur compounds which comprises reacting with cyanogen chloride on an aqueous solution of a compound having the general formula

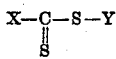

wherein X represents a radical of the class: $R_2N$, RO, R, RS (R representing an aryl or alkyl hydrocarbon group) and Y represents an alkali metal.

2. The process of making organic sulphur compounds which comprises reacting with a cyanogen halide on an aqueous solution of an alkali metal salt of an acid of the group consisting of dithio and trithio acids.

3. The process of making organic sulphur compounds which comprises reacting with cyanogen chloride on a salt of an acid of the group consisting of dithio and trithio acids.

4. The process of making organic sulphur compounds which comprises reacting with cyanogen chloride on an alkali metal salt of a dithio acid.

5. The process of making organic sulphur compounds which comprises reacting with cyanogen chloride on an aqueous solution of a water soluble salt of a dithio acid.

6. The process of making organic sulphur compounds which comprises reacting with cynanogen chloride on a compound of the group consisting of the alkali metal dithio carbamates and alkali metal alkyl xanthates.

7. The process of making organic sulphur compounds which comprises reacting with cyanogen chloride or an aqueous solution of sodium diethyl dithio carbamate.

8. The process of making organic sulphur compounds which comprises reacting with cyanogen chloride on a salt of a dithio acid.

9. The process of making organic sulphur compounds which comprises reacting with cyanogen chloride on an aqueous solution of sodium ethyl xanthate.

10. The process of making organic sulphur compounds which comprises reacting with cyanogen halide a di-thio-acid having the general formula

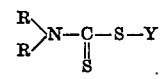

in which R is an aryl or alkyl hydrocarbon group and Y is an alkali metal.

11. The process of making organic sulphur compounds which comprises reacting with cyanogen halide a di-thio-acid having the general formula

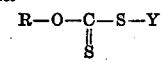

in which R is an aryl or alkyl hydrocarbon group and Y is an alkali metal.

12. The process of making organic sulphur compounds which comprises reacting with cyanogen halide a di-thio-acid having the general formula

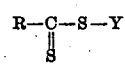

in which R is an aryl or alkyl hydrocarbon group and Y is an alkali metal.

13. The process of making organic sulphur compounds which comprises reacting with cyanogen chloride an aqueous solution of a salt of a di-thio-acid having the general formula

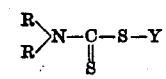

in which R is an aryl or alkyl hydrocarbon group and Y is an alkali metal.

14. The process of making organic sulphur compounds which comprises reacting with cyanogen chloride an aqueous solution of a salt of a di-thio-acid having the general formula

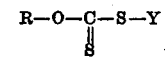

in which R is an aryl or alkyl hydrocarbon group and Y is an alkali metal.

15. The process of making organic sulphur compounds which comprises reacting with cyanogen chloride an aqueous solution of a salt of a di-thio-acid having the general formula

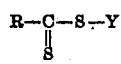

in which R is an aryl or alkyl hydrocarbon group and Y is an alkali metal.

In testimony whereof, I affix my signature.

DONALD H. POWERS.

Certificate of Correction

Patent No. 1,788,632.                         Granted January 13, 1931, to

DONALD H. POWERS.

It is hereby certified that error appears in the printed specification of the above numbered patent requiring correction as follows: Page 1, strike out the equation between lines 92 and 94, and insert instead

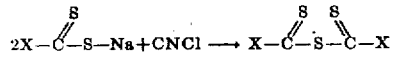

and that the said Letters Patent should be read with this correction therein that the same may conform to the record of the case in the Patent Office.

Signed and sealed this 10th day of February, A. D. 1931.

[SEAL.]

M. J. MOORE,
*Acting Commissioner of Patents.*